United States Patent
Lin (10) Patent No.: US 8,408,812 B2
(45) Date of Patent: Apr. 2, 2013

(54) OPTICAL FIBER CONNECTOR WITH ROTATABLE COVER AND OPTICAL FIBER CONNECTOR ASSEMBLY HAVING SAME

(75) Inventor: I-Thun Lin, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 439 days.

(21) Appl. No.: 12/766,905

(22) Filed: Apr. 25, 2010

(65) Prior Publication Data

US 2011/0158587 A1    Jun. 30, 2011

(30) Foreign Application Priority Data

Dec. 31, 2009   (TW) .............................. 98146144 A (51) Int. Cl.
  *G02B 6/36* (2006.01)

(52) U.S. Cl. ........................................................ 385/70

(58) Field of Classification Search .................... 385/60, 385/70, 88–90, 147
See application file for complete search history.

(56) References Cited

U.S. PATENT DOCUMENTS

| 4,119,362 | A | * | 10/1978 | Holzman .......................... 385/74 |
| 5,080,461 | A | * | 1/1992 | Pimpinella ...................... 385/65 |
| 5,825,955 | A | * | 10/1998 | Ernst et al. ...................... 385/79 |
| 6,530,700 | B2 | * | 3/2003 | Williams ......................... 385/92 |
| 7,338,217 | B2 | * | 3/2008 | Morimoto et al. ............... 385/88 |
| 7,563,032 | B2 | * | 7/2009 | Nielson et al. .................. 385/53 |
| 2004/0179787 | A1 | | 9/2004 | Glazowski et al. |
| 2009/0214165 | A1 | | 8/2009 | Shimotsu et al. |

FOREIGN PATENT DOCUMENTS

CN           101156100 A      4/2008

* cited by examiner

*Primary Examiner* — Akm Enayet Ullah
(74) *Attorney, Agent, or Firm* — Altis Law Group, Inc.

(57) ABSTRACT

An optical fiber connector includes a casing, an optical fiber coupler, and at least one cover. The casing has a receiving space therein and an opening communicating with the receiving space. The optical fiber coupler is accommodated in the receiving space. The optical fiber coupler includes a plurality of lenses and an engaging part. The lenses and the engaging part face the opening. The at least one cover is rotatably coupled to the casing. The at least one cover is rotatable between a first position where the cover substantially covers the opening and seals the optical fiber coupler in the casing and a second position where the optical fiber coupler exposes through the opening.

10 Claims, 11 Drawing Sheets

OPTICAL FIBER CONNECTOR WITH ROTATABLE COVER AND OPTICAL FIBER CONNECTOR ASSEMBLY HAVING SAME

BACKGROUND

1. Technical Field

The present disclosure relates to an optical fiber connector and an optical fiber connector assembly having the optical fiber connector.

2. Description of Related Art

Generally, data transmission between electronic devices (e.g., between a personal computer and a flash memory) is achieved in the form of electronic signals. Sometimes, the transmission of electronic signals may be interfered with by outside signals (e.g., electromagnetic waves) or even interrupted causing loss of data.

Therefore, it is desirable to provide a new optical fiber connector and a new optical fiber connector assembly, which can overcome the above-mentioned limitations.

DETAILED DESCRIPTION

Figure 1:
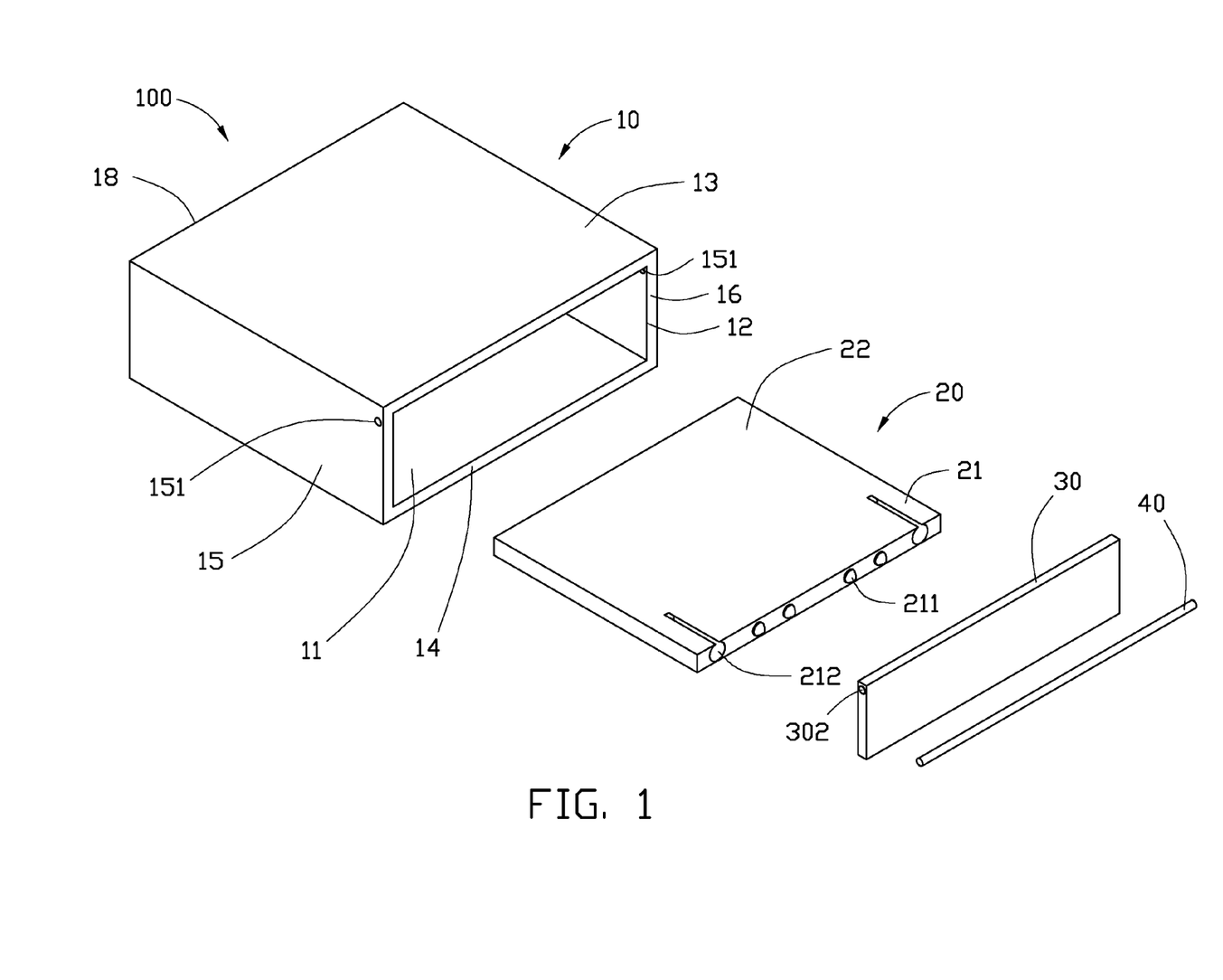
FIG. 1 is an isometric, exploded view of a first optical fiber connector, according to a first embodiment.
Figure 2:
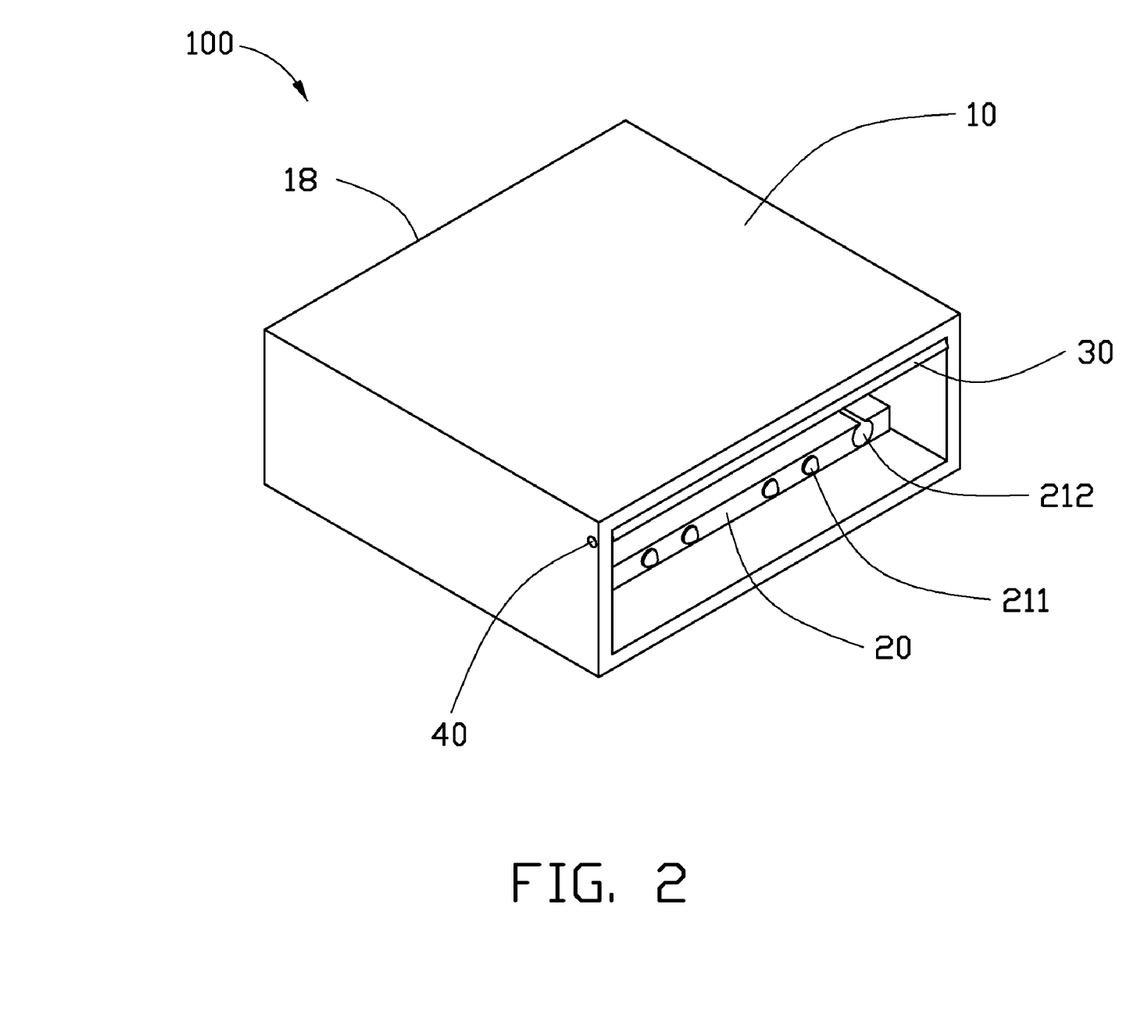
FIG. 2 is an isometric, assembled view of the first optical fiber connector of FIG. 1.
Figure 3:
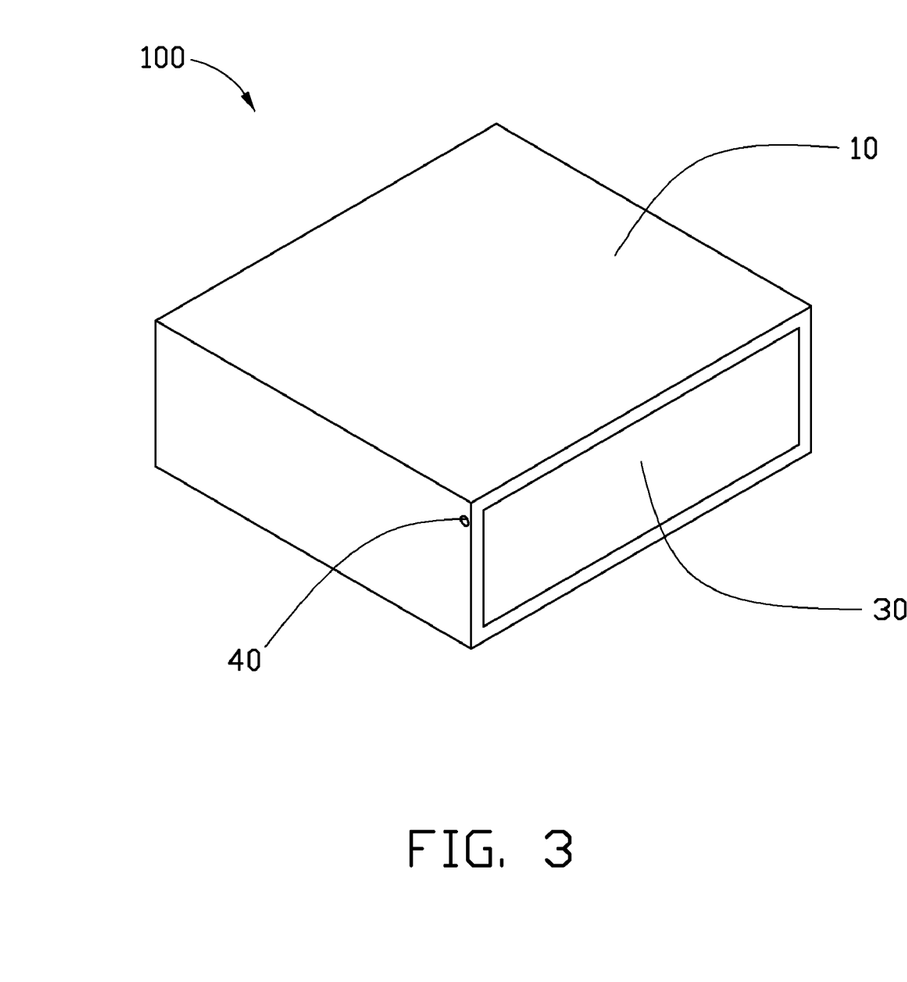
FIG. 3 is an isometric view of the first optical fiber connector of FIG. 1 when inactive.

Referring to FIGS. 1-3, a first optical fiber connector 100 according to a first embodiment is shown. The first optical fiber connector 100 includes a first casing 10, a first optical fiber coupler 20, a first cover 30, and a first shaft 40.

The first casing 10 includes a top plate 13, a bottom plate 14, a left plate 15, a right plate 16, and a rear plate 18 cooperatively define a receiving space 11 with a first opening 12. A shaft hole 151 is defined in each of the left plate 15 and the right plate 16. The shaft holes 151 are adjacent to the opening 12 and the top plate 13.

The first optical fiber coupler 20 is accommodated in the receiving space 11 and mounted on the bottom plate 14. The first optical fiber coupler 20 includes a first end 21 and an opposite second end 22. The first end 21 includes four first lenses 211 and two engaging parts (i.e., two holes 212). In the present embodiment, the engaging parts are holes. It is to be understood that in other embodiments, the engaging parts can be pins. The second end 22 is for connecting optical fibers (not shown), which extend through the rear plate 18. The first lenses 211 are configured for converging or collimating light.

The first cover 30 includes a through hole 302 defined therein. The first shaft 40 extends through the through hole 302 and ends thereof respectively insert into the shaft holes 151 so that the first cover 30 is rotatable around the first shaft 40. In other embodiments, the first cover 30 can be rotatably coupled to the casing 10 in various known configurations, for example, using a hinge (not shown) instead of the first shaft 40. When the first optical fiber connector 100 is inactive, the first cover 30 is in an initial position. In this position, the first cover 30 covers the first opening 12 and seals the first optical fiber coupler 20 in the first casing 10. In this way, the first optical fiber coupler 20 is prevented from being contaminated and damaged (see FIG. 3).

Figure 4:
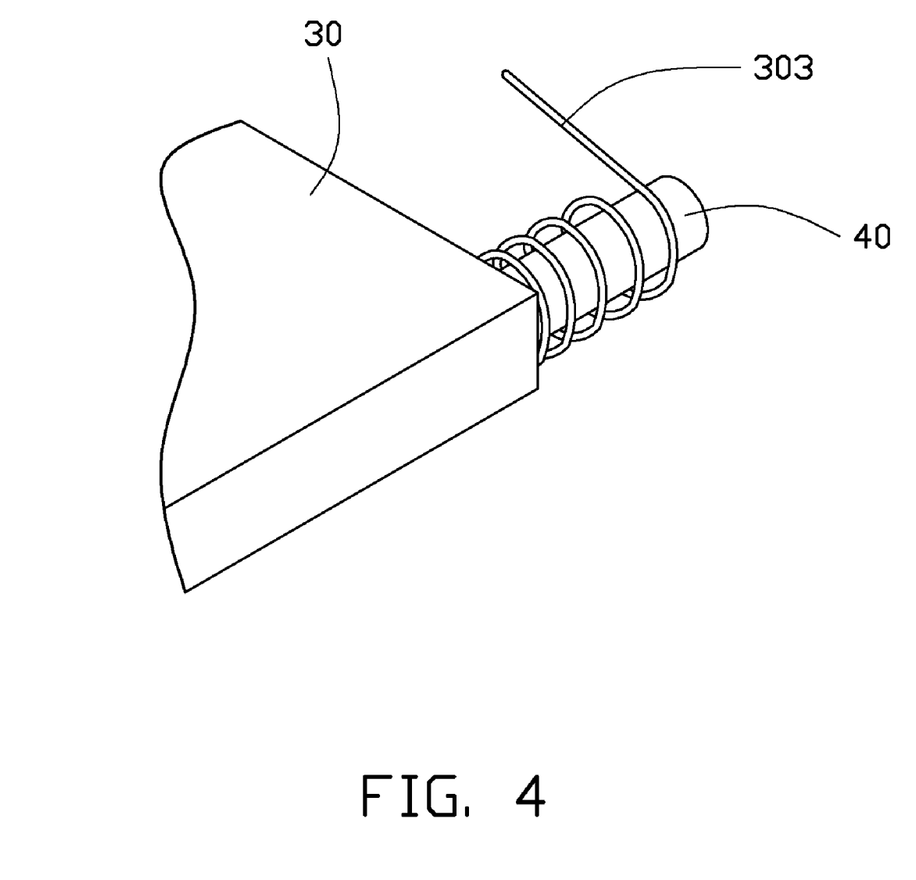
FIG. 4 is an isometric view of a part of a casing and a part of a shaft of the first optical fiber connector of FIG. 1, with the addition of a spring wound around the shaft.

In order to make the first cover 30 return to the initial position, a spring 303 can be wound around one end of the first shaft 40, referring to FIG. 4. One end of the spring 303 is inserted in the first cover 30, the other end of the spring 303 contacts the top plate 13. The spring 303 is configured for exerting an elastic restoring force to the first cover 30 so that the first cover 30 can return to the initial position after being moved and released.

The way the spring 303 is arranged is not limited to the way illustrated in FIG. 4. The spring 303 can be arranged in other ways as long as the spring 303 can restore the first cover 30 to the initial position.

Figure 5:
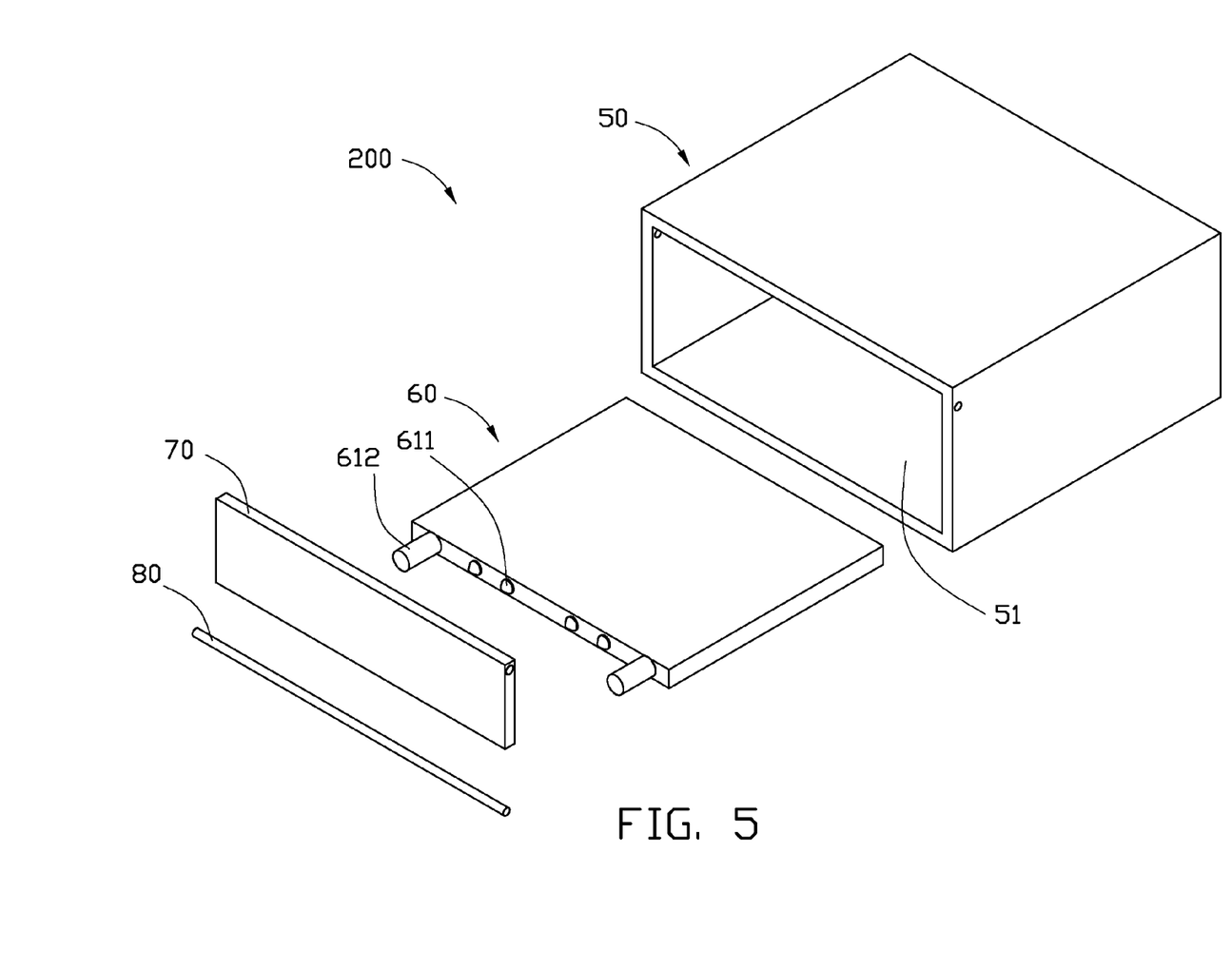
FIG. 5 is an isometric, exploded view of a second optical fiber connector, according to a second embodiment.
Figure 6:
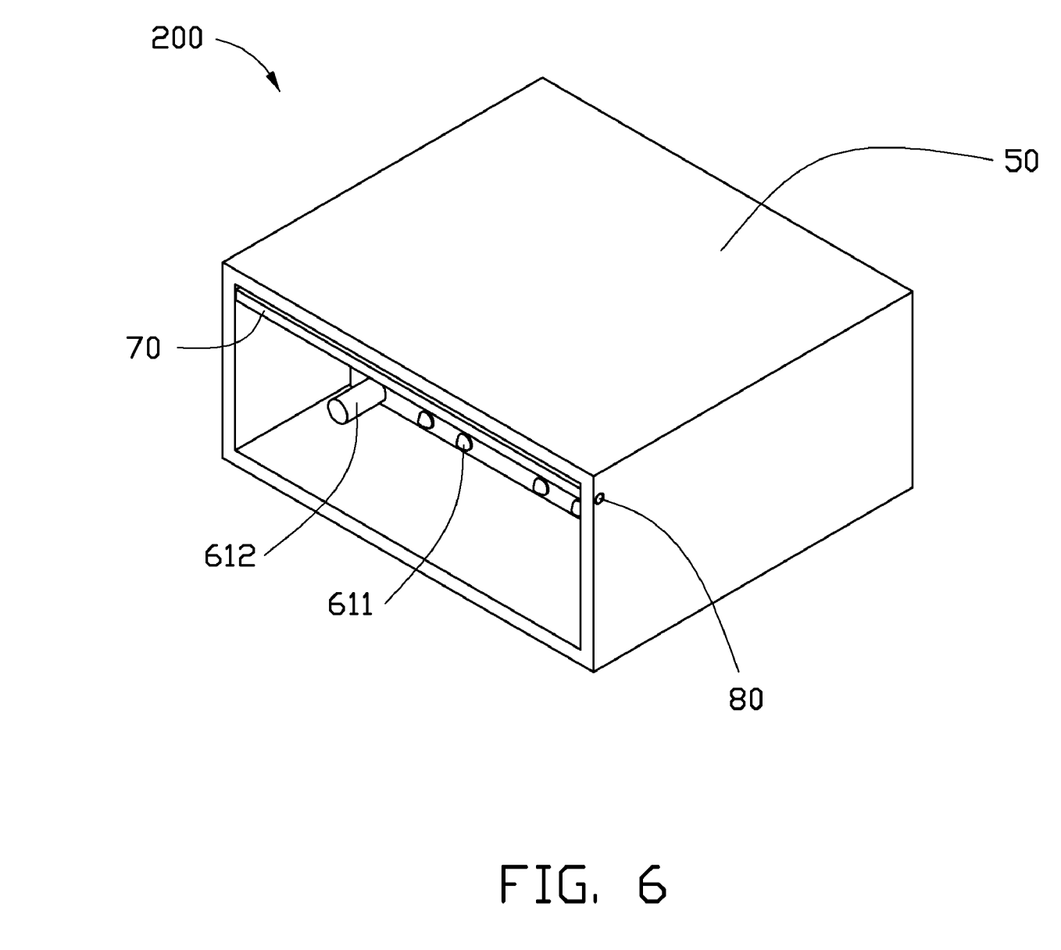
FIG. 6 is an isometric, assembled view of the second optical fiber connector of FIG. 5.
Figure 7:
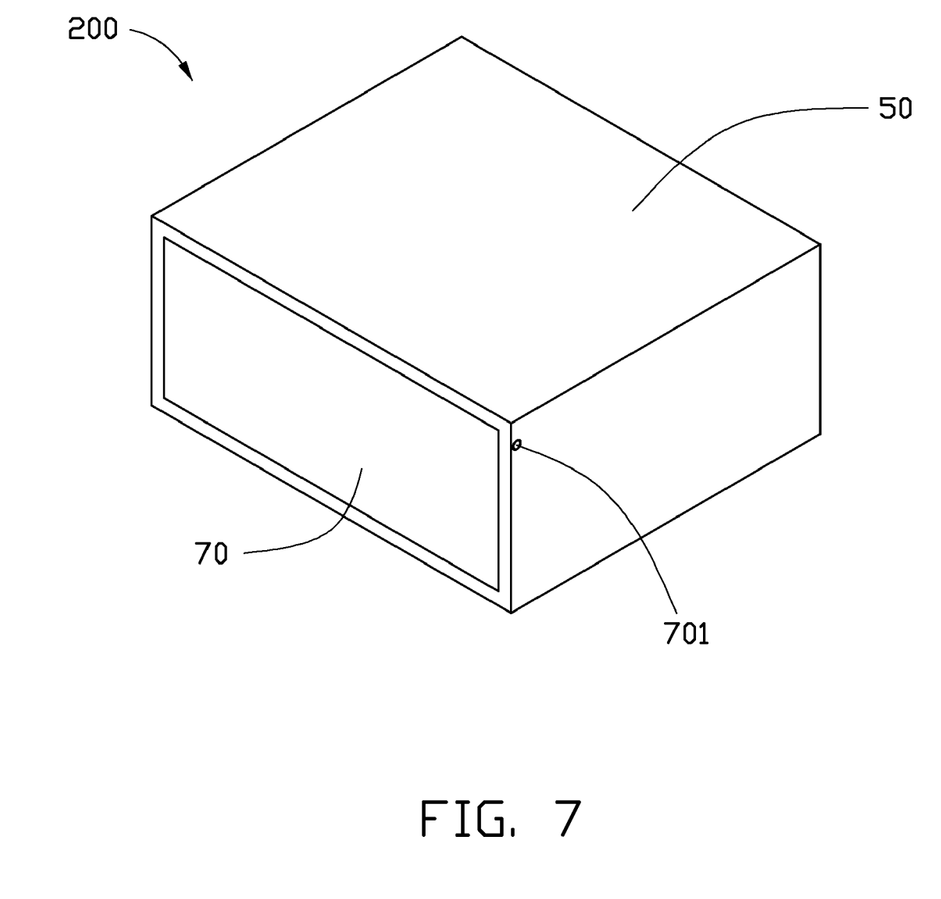
FIG. 7 is an isometric view of the second optical fiber connector of FIG. 5 when inactive.

Referring to FIGS. 5-7, a second optical fiber connector 200 according to a second embodiment is shown. The second optical fiber connector 200 includes a second casing 50, a second optical fiber coupler 60, a second cover 70, and a second shaft 80. The second optical fiber coupler 60 includes four second lenses 611 formed on an end surface thereof. The second casing 50 defines a second receiving space 51. The second optical fiber connector 200 is similar to the first optical fiber connector 100, except that the second optical fiber coupler 60 includes two pins 612 as engaging parts and the second optical fiber connector 200 is larger than the first optical fiber connector 100. The two pins 612 are for engaging in a respective hole 212 (see FIG. 1). The second receiving space 51 is larger than the first casing 10 so that the first casing 10 can be received in the second receiving space 51 (see FIG. 8).

Figure 8:
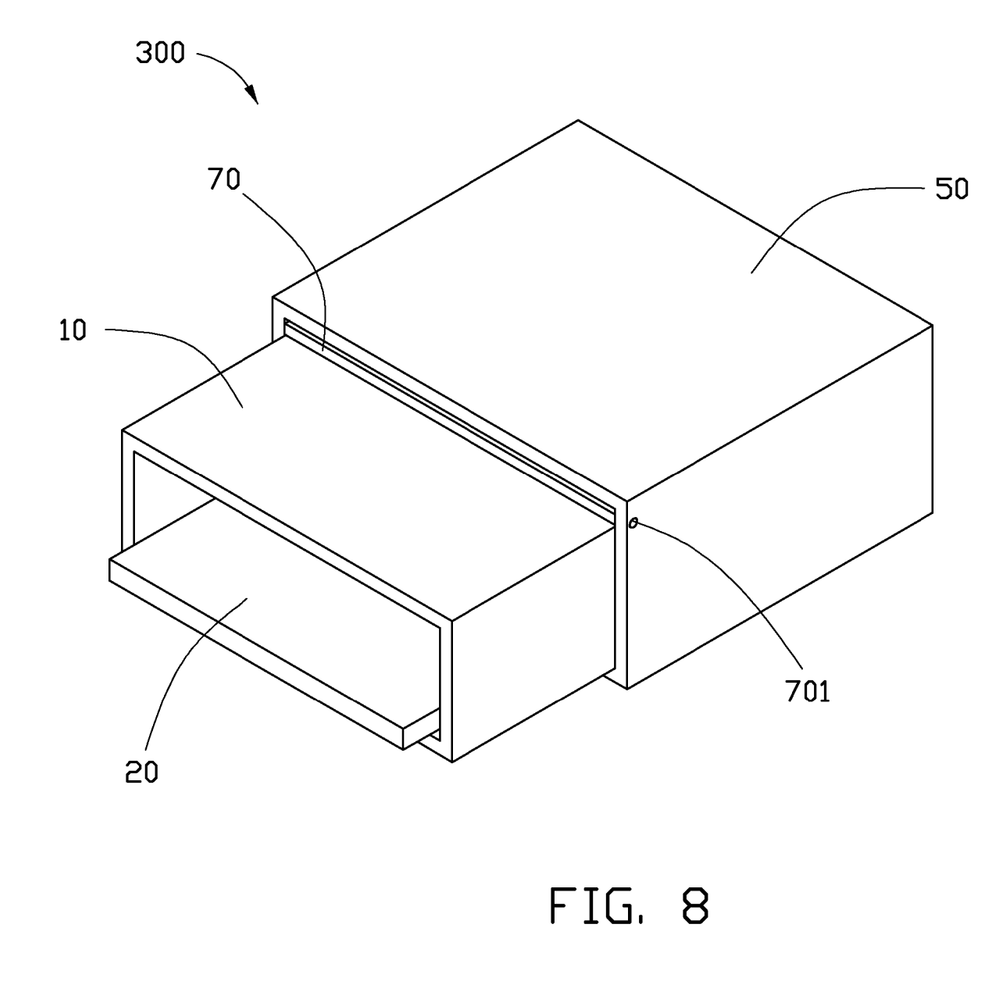
FIG. 8 is an isometric view of an optical fiber connector assembly according to a third embodiment, including the first optical fiber connector of FIG. 1 and the second optical fiber connector of FIG. 5 coupled to the first optical fiber connector of FIG. 1.
Figure 9:
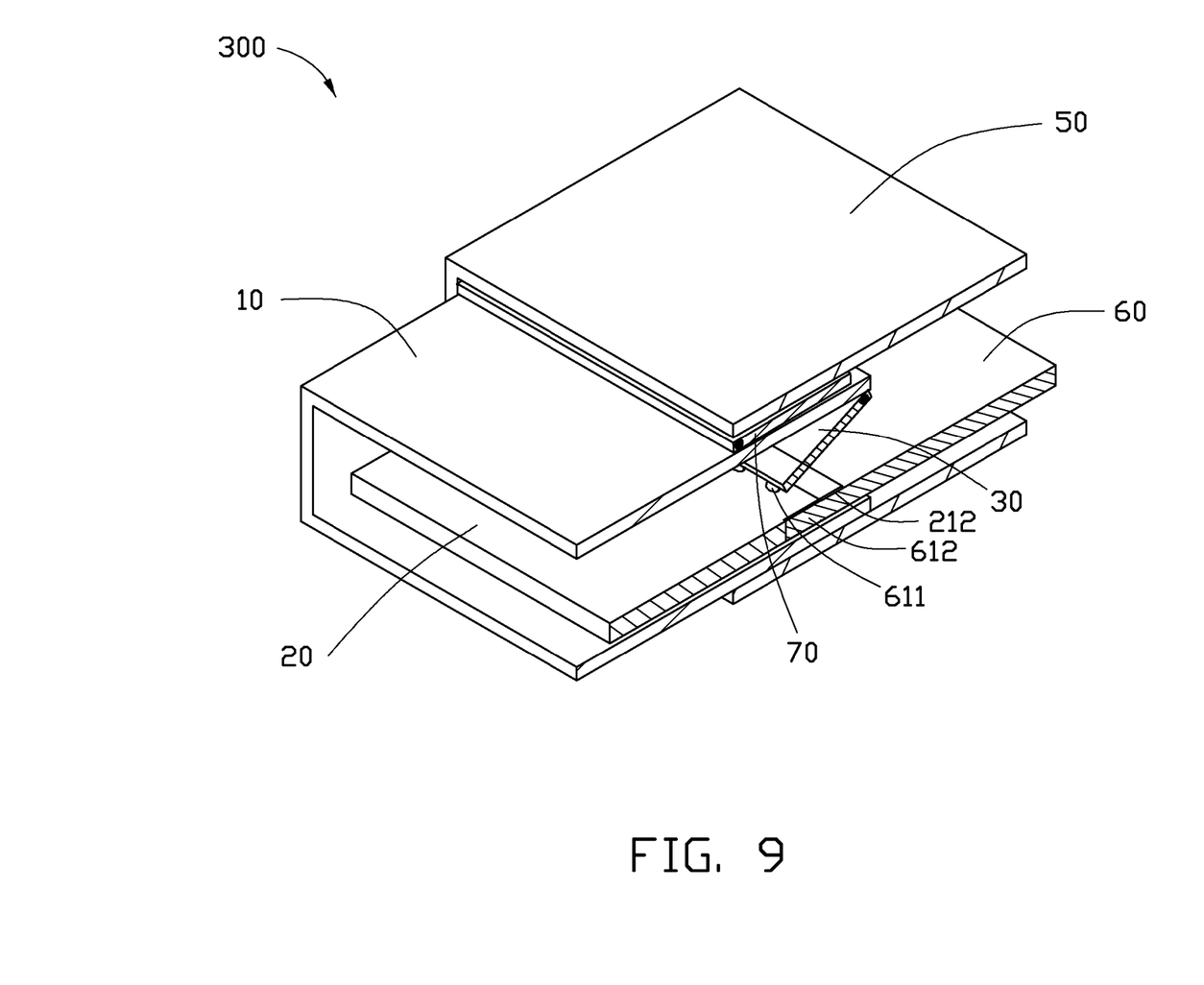
FIG. 9 is an isometric, cut-away view of the optical fiber connector assembly of FIG. 8.

Referring to FIGS. 8-9, an optical fiber connector assembly 300 according to a third embodiment, is shown. The optical fiber connector assembly 300 includes the first optical fiber connector 100 and the second optical fiber 200 coupled with the first optical fiber connector 100.

In assembly, the first optical fiber connector 100 is inserted into the second receiving space 51 of the second optical fiber connector 200. In this process, the first optical fiber connector 100 acts on the second cover 70 and drives the second cover 70 to rotate around the second shaft 80 towards the second receiving space 51. When the pins 612 contacts the first cover 30, the pins 612 drives the first cover 30 to rotate around the first shaft 40 towards the first receiving space 11. Finally, the pins 612 engage in the holes 212, the second cover 70 is driven by the first casing 10 to rotate to a position above the first casing 10, and the first cover 30 is driven by the pins 612 to rotate to a position above the second optical fiber coupler 60. In this position, the first lenses 211 are in optical alignment with the second lenses 611 in a one-to-one relationship. In this way, the first and second optical fiber connectors 100, 200 can achieve communication of data therebetween.

The optical fiber connector assembly 300 conveys data in the form of light. The transmission speed is high. Because the transmission is less likely to be interfered with by outside signals, the transmission is stable.

It is to be understood that the first and second optical fiber connectors 100, 200 can be used as input/output components in a variety of electronic devices, such as computers, flash memories.

Figure 10:
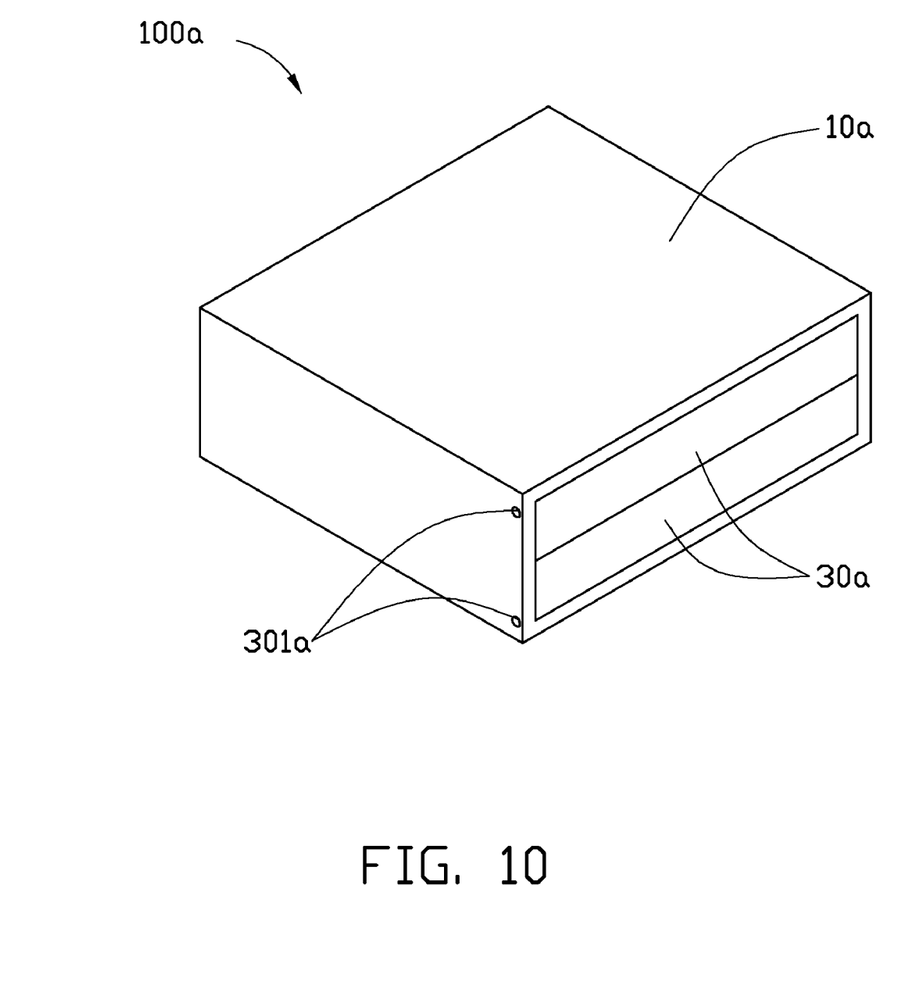
FIG. 10 is an isometric view of an optical fiber connector according to a fourth embodiment.

Referring to FIG. 10, an optical fiber connector 100a according to a fourth embodiment is shown. The optical fiber connector 100a includes a casing 10a. The optical fiber connector 100a is similar to the first optical fiber connector 100 or the second optical fiber connector 200 except that the optical fiber connector 100a includes two covers 30a (a top cover and a bottom cover) and two horizontal shafts 301a. The two covers 30a are rotatably coupled to the casing 10a via a corresponding shaft 301a. The two covers 30a are for cooperatively sealing the casing 10a.

Figure 11:
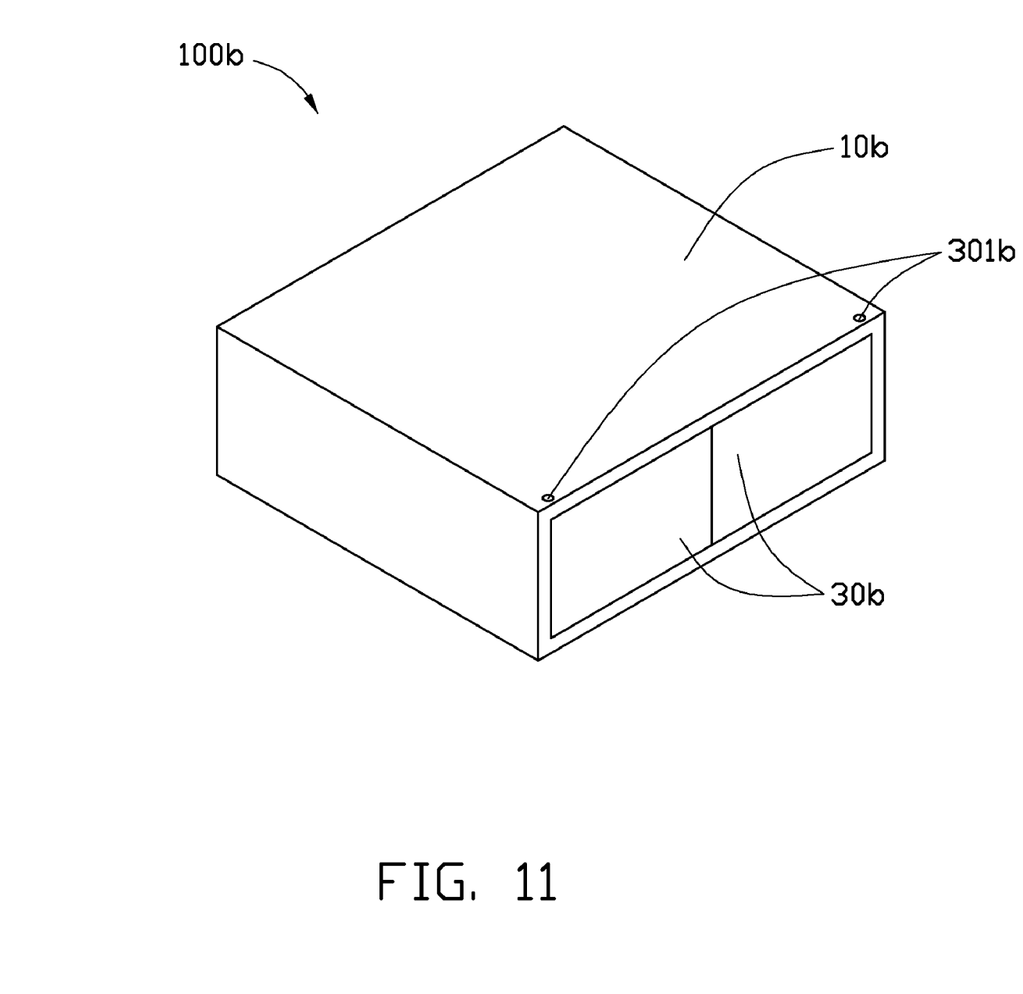
FIG. 11 is an isometric view of an optical fiber connector according to a fifth embodiment.

Referring to FIG. 11, an optical fiber connector 100b according to a fifth embodiment is shown. The optical fiber connector 100b includes a casing 10b. The optical fiber connector 100b is similar to the first optical fiber connector 100 or the second optical fiber connector 200 except that the optical fiber connector 100b includes two covers 30b (a left cover and a right cover) and two vertical shafts 301b. The two covers 30b are rotatably coupled to the casing 10b via a corresponding shat 301b. The two covers 30b are for cooperatively sealing the casing 10b.

While various embodiments have been described, it is to be understood that the disclosure is not limited thereto. To the contrary, various modifications and similar arrangements (as would be apparent to those skilled in the art), are also intended to be covered. Therefore, the scope of the appended claims should be accorded the broadest interpretation so as to encompass all such modifications and similar arrangements.

What is claimed is:

1. An optical fiber connector, comprising:
   a casing having a receiving space therein and an opening communicating with the receiving space;
   an optical fiber coupler accommodated in the receiving space, the optical fiber coupler comprising a plurality of lenses and an engaging part, the lenses and the engaging part facing the opening;
   two shafts fixed to the casing; and
   two covers, each of the two covers rotatable around a respective one of the two shafts;
   the two covers being rotatable between a first state where the two covers cooperatively cover the opening and seal the optical fiber coupler in the casing and a second state where the optical fiber coupler exposes through the opening.

2. The optical fiber connector of claim 1, wherein the engaging part is one of a pin and a hole.

3. The optical fiber connector of claim 1, further comprising two springs wound around the two shafts respectively, wherein each of the two springs has a first end and a second end, the first end of each spring is inserted in the respective cover, the second end of each spring is in contact with the casing, and each spring is configured for providing the respective cover an elastic restoring force to return to the first state from the second state.

4. The optical fiber connector of claim 1, wherein the lenses and the engaging part are formed on an end surface of the optical fiber coupler.

5. An optical fiber connector assembly comprising:
   a first optical fiber connector comprising:
      a first casing having a first receiving space therein and a first opening communicating with the first receiving space;
      a first optical fiber coupler accommodated in the first receiving space, the first optical fiber coupler comprising a plurality of first lenses and a first engaging part, the first lenses and the first engaging part facing the first opening;
      two first shafts fixed to the casing; and
      two first covers, each of the two first covers rotatable around a respective one of the two first shafts;
      the two first covers being rotatable between a first state where the two first covers cooperatively cover the first opening and seal the first optical fiber coupler in the first casing and a second state where the first optical fiber coupler exposes through the first opening;
   a second optical fiber connector comprising:
      a second casing having a second receiving space therein and a second opening communicating with the second receiving space;
      a second optical fiber coupler accommodated in the second receiving space, the second optical fiber coupler comprising a plurality of second lenses and a second engaging part, the second lenses and the second engaging part facing the second opening; and
      at least one second cover rotatably coupled to the second casing, the at least one second cover being rotatable between a third state where the at least one second cover substantially covers the opening and seals the second optical fiber coupler in the second casing and a fourth state where the second optical fiber coupler exposes through the second opening,
   wherein the first optical fiber connector is received in the second receiving space in such a manner that the first engaging part is coupled to the second engaging part, each first lens is in optical alignment with a respective second lens.

6. The optical fiber connector assembly of claim 5, wherein the second optical fiber connector further comprises at least one second shaft, each of the at least one second cover is coupled to the second casing via a respective one of the at least one second shaft, and is rotatable around the respective second shaft.

7. The optical fiber connector assembly of claim 5, wherein the first engaging part is one of a pin and a hole, and the second engaging part is the other of the pin and the hole.

8. The optical fiber connector assembly of claim 5, wherein the second optical fiber connector further comprises two second shafts, the number of the at least one second cover is two, the two second covers rotatable around the two second shafts respectively.

9. The optical fiber connector assembly of claim 5, wherein the first optical fiber connector further comprises two first springs wound around the two first shafts respectively, each of the two first springs has a first end and a second end, the first end of each first spring is inserted in the respective first cover, the second end of each first spring is in contact with the first casing, and each first spring is configured for providing the respective first cover an elastic restoring force to return to the first state from the second state.

10. The optical fiber connector assembly of claim 6, wherein the second optical fiber connector further comprises at least one second spring wound around the at least one second shaft respectively, a first end of each second spring is inserted in the respective second cover, a second end of each second spring is in contact with the second casing, and each second spring is configured for providing the respective second cover an elastic restoring force to return to the third state from the fourth state.

* * * * *